United States Patent [19]
Andra et al.

[11] Patent Number: 4,686,820
[45] Date of Patent: Aug. 18, 1987

[54] CYLINDRICAL BALER HAVING BALE-SHAPE-RESPONSIVE LOADING CONTROL SYSTEM

[75] Inventors: Bryan K. Andra, Hays; Kent D. Funk, Manhattan; Clyde J. Lang, Ellis; Philip Todd, Maple Hill, all of Kans.

[73] Assignee: Kansas State University Research Foundation, Manhattan, Kans.

[21] Appl. No.: 704,429

[22] Filed: Feb. 22, 1985

[51] Int. Cl.[4] ............................................. A01D 39/00
[52] U.S. Cl. ........................................ 56/341; 100/88
[58] Field of Search ................. 56/341, DIG. 15, 343; 100/88, 89, 5, 4, 13

[56] References Cited

U.S. PATENT DOCUMENTS

| 4,433,533 | 2/1984 | Giani | 56/341 |
| 4,517,795 | 5/1985 | Meiers | 56/341 |

FOREIGN PATENT DOCUMENTS

| 749370 | 7/1980 | U.S.S.R. | 56/341 |

Primary Examiner—Paul J. Hirsch
Attorney, Agent, or Firm—Schmidt, Johnson, Hovey & Williams

[57] ABSTRACT

As the tractor and baler are driven straight down the windrow, hay is picked up and placed upon a platform conveyor which transfers the same rearwardly toward the baling chamber, during which transfer a deflector diverts the crop stream into an appropriate one of three axial sections of the chamber as determined by sensing and control mechanism associated with the baler. As the hay builds up in one of the sections, the sensors of the mechanism compare the size of that portion of the bale with the bale portion in the next adjacent chamber section, and once the differential between the two bale portions reaches a certain predetermined level, the control mechanism swings the deflector to its next position, directing hay into that next adjacent section to build up that portion of the bale. While build up is occurring in that section, such build up is compared with that in the next adjacent section until the deflector is shifted again, and so on, until a finished bale of uniform diameter from end-to-end has been completed without requiring that the operator weave the baler back-and-forth on the windrow. The need for hay within the respective chamber sections is sensed by the difference in tension of forming belts associated with the corresponding chamber sections, and a microprocessor serves as the primary control source for the deflector movement.

36 Claims, 8 Drawing Figures

CYLINDRICAL BALER HAVING BALE-SHAPE-RESPONSIVE LOADING CONTROL SYSTEM

TECHNICAL FIELD

This invention relates to the field of crop harvesters and, more particularly, to rotary balers of the type commonly referred to as "big round balers" producing cylindrical bales of crop material weighing several hundred pounds. The invention is particularly directed to an improved arrangement for loading such a baler with incoming crop material for use in forming the bale itself.

BACKGROUND

Many varieties of round balers are currently commercially available. A frequently encountered problem, however, involves the fact that the width of the baling chambers on such machines is typically greater than the width of the crop windrow along which the baler is driven. Consequently, in order to avoid an oddly shaped bale and to be assured that the chamber will be evenly loaded with material from end-to-end, many manufacturers instruct the operator to weave back-and-forth across the windrow as he drives along. This requires considerable operator attention and necessitates having the operator look back over his shoulder frequently in an effort to inspect the bale chamber, instead of watching ahead and being on the alert for possible danger.

Moreover, even though the bale may appear to be uniform in diameter, the density of the bale may be non-uniform. This lack of uniform density leads to a reduction in the total weight per bale and to an increase in spoilage when the bales are stored outside. During nighttime baling, which is a common practice for alfalfa hay during hot summer months, the problem is exacerbated because it is even more difficult for the operator to clearly see what is happening in the bale chamber under low light conditions. Spot lights which may be installed in and around the baler can often provide a glare which further compounds the problem.

Several efforts have been made to improve the state of the art in this respect including, for example, the system disclosed in U.S. Pat. No. 4,224,867, issued in the name of Gaeddert et al on Sept. 30, 1980. This patent is directed to the concept of producing a signal as a result of sensing a lack of uniform crop distribution in the baling chamber. Such signal may be used to power warning lights and the like in the cab of the tractor whereby to alert the operator to the need for taking appropriate weaving action. While alerting the operator through a warning device solves part of the problem, it still requires overt action by the operator in response to his realization that the bale chamber is not filling evenly.

U.S. Pat. No. 4,065,914, issued Jan. 3, 1978, in the name of Phillips et al, discloses the concept of driving the tractor straight down the windrow but then having a control at the tractor seat which permits the operator to steer the baler and cause it to weave relative to the tractor so that the baler can then introduce the narrow windrow successively across all portions of the chamber. However, this, too, requires constant operator attention.

U.S. Pat. No. 4,433,533, issued in the name of Giani on Feb. 28, 1984, discloses the concept of weaving the baler behind the tractor in an automatic manner without driver attention by virtue of sensors which detect the need for crop in the various portions of the chamber and then cause the baler to be weaved or turned accordingly. However, in this machine the large mass of the baler would apparently have a detrimental effect on the response time of the control system involved; moreover, the system is not totally insulated from adverse positioning of the tractor relative to the windrow. In other words, even though the baler might automatically shift in one direction in response to a need, there is nothing to prevent the operator from inadvertently drifting the tractor in the opposite direction, thereby reducing or effectively cancelling out the repositioning shift of the baler. To a certain extent, then, even in this system the extent of uniform loading in the bale chamber is dependent upon the operator maintaining a proper position along the windrow.

SUMMARY OF THE PRESENT INVENTION

Accordingly, one important object of the present invention is to overcome the deficiencies of prior uniform loading techniques by providing a loading system which permits the operator to drive both the tractor and baler down the windrow without regard to whether the windrow is perfectly centered relative to the tractor and baler or off to one side of the center line of travel thereof. In this respect, during bale formation, the stream of material coming into the baler is automatically directed back and forth in the bale chamber into successive discrete sections thereof for separate time periods of relatively short duration. The amount of time material is directed into each of the respective chamber sections depends upon size considerations as opposed to time factors. In other words, the crop material entering one section of the chamber will not be diverted to a next section until the bale portion building up in the filling chamber section reaches a certain size relative to that of the adjacent chamber section, whereupon the stream is diverted into that next section until, once again, the size of the bale in that area increases to a certain level compared to the bale portion in the next adjacent chamber section as the bale is traversed from one end to the other. Numerous "passes" along the length of the bale in opposite directions are contemplated so that the hay deposited during each pass is only a few inches thick. Furthermore, ideally bale formation is commenced by first forming a core across the entire width of the chamber which is made by continuously directing the incoming stream of materials in a sweeping action back and forth across the width of the chamber without stopping at the various chamber sections in the above-described manner. Preferably, the size differential required to shift the stream from one chamber section to the next is progressively reduced as the average size of the bale increases, so that during placement of the finishing layers on the bale, the stream is almost continuously sweeping back and forth along the length of the bale.

The determination of when to shift the incoming stream of materials from one chamber section to the next is made by comparing relative belt tensions between a series of the belts which roll and compact the hay within the chamber. Signals from sensors associated with such belts are transmitted to a microprocessor which compares the signals with one another and activates mechanism for shifting a deflector for the crop stream when the time is appropriate.

DETAILED DESCRIPTION

Figure 1:
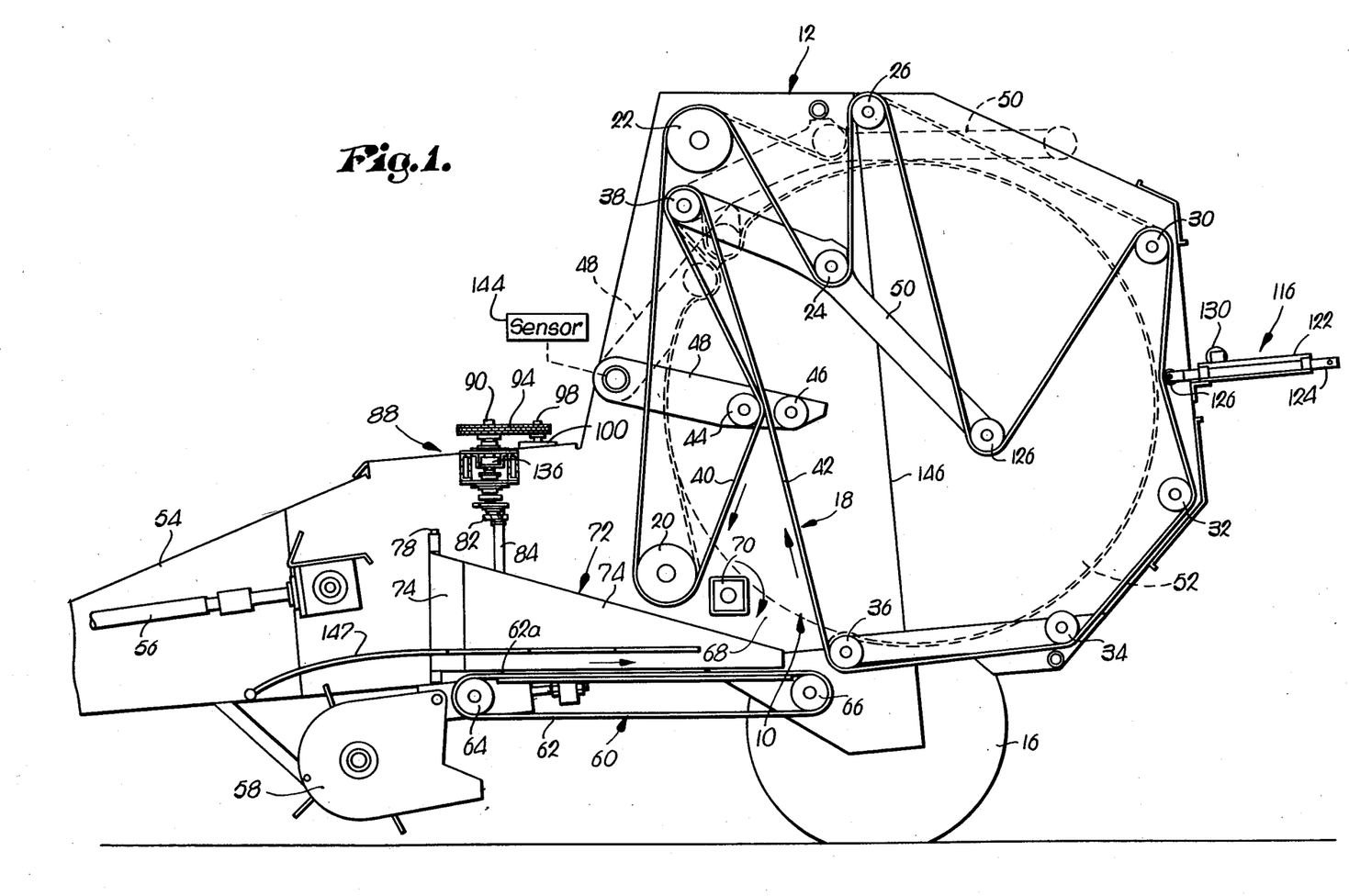
FIG. 1 is a fragmentary, side elevational view of a baler constructed in accordance of the present invention with the near sidewall of the baler and other obstructing structure removed to reveal details of construction.

The baler of the present invention includes a baling chamber broadly denoted by the numeral 10 which is defined in part by a pair of upright, opposite sidewalls 12 and 14 which are carried by ground wheels 16 (only one illustrated) for advancing the chamber 10 across a field. The chamber 10 is further defined by a set of five flexible, endless webs or belts denoted generically in FIG. 1 by the numeral 18 and specifically in FIG. 2 by the designations 18a, 18b, 18c, 18d, and 18e respectively. As illustrated in FIG. 1, the belts 18 are trained around a series of rollers 20, 22, 24, 26, 28, 30, 32, 34, 36, and 38, and two generally upright stretches 40 and 42 of the belts 18 pass between a pair of cooperating, overhead guide rollers 44 and 46 mounted upon a vertically swingable arm assembly 48 which moves between the lowered, solid line position and the raised, phantom line position illustrated in FIG. 1. The rollers 24 and 28 are likewise carried by a second arm assembly 50 which, through connection to a spring assembly (not shown) on the outside of the baler applies yieldable tension to the belts 18 as the bale grows within the chamber 10.

With the arm assembly 50 in its lowered, solid-line position of FIG. 1, the chamber 10 is in its smallest condition for start up whereas, when the arm assembly 50 is fully raised to its phantom line position in FIG. 1, the bale chamber 10 is in its largest condition encircling a bale shown in phantom lines and designated by the numeral 52. The belts 18 are driven by supplying power to the rollers 20 and 22 in such a direction that the belt stretch 42 normally moves generally upwardly in the chamber 10 at the commencement of a baling cycle and the stretch 40 moves generally downwardly at such time.

The baler further includes a forwardly extending tongue 54 located ahead of the bale chamber 10 and adapted at its forward end for suitable connection with a towing vehicle (not shown). A fore-and-aft extending drive line 56 associated with the tongue 54 may be connected at its forward end to the power take-off shaft of the towing vehicle for the purpose of supplying driving power to the various mechanically driven components of the baler including, for example, the belts 18, a windrow pickup 58 located beneath tongue 54 forwardly of the chamber 10, and a platform conveyor 60 located immediately behind the pickup 58.

The conveyor 60 includes an endless, wide, flat apron 62 entrained around a pair of fore-and-aft spaced-apart rollers 64 and 66, one of which is suitably driven so that the upper stretch 62a moves rearwardly toward the bale chamber 10. As noted, the upper stretch 62a is substantially flush with the level of the upper extremities of the pickup 58 so that crop lifted off the ground by the latter during advancement of the baler may be deposited on the conveyor 60 and moved rearwardly toward the chamber 10. It will be noted in FIG. 2 that the conveyor 60 is at least substantially the same width as the pickup 58 and the bale chamber 10. FIG. 1 shows that the rear extremity of the conveyor 60, as represented by the rear transverse roller 66, terminates slightly below and forwardly adjacent the belt roller 36, thus placing the rear end portion of the conveyor 60 immediately beneath an entrance 68 to the chamber 10 defined between the roller 20 and 36. A transversely extending bale starting roller 70 of polygonal cross-sectional configuration is disposed within the entrance 68 generally at the level of a line interconnecting the centers of rollers 20 and 36 and rotatable in a clockwise direction as viewed in FIG. 1 in order to assist in driving the bale 52 as it is formed in the baler and for keeping the lower forward extremity thereof generally off the roller 20 to avoid pinching the belt stretch 40 between the latter and the bale.

Deflector structure broadly denoted by the numeral 72 and hereinafter referred to as the "deflector" is positioned in overlying relationship to the conveyor 60 between the pickup 58 and the baling chamber 10. Such deflector 72 actually comprises a pair of generally triangular, upright and laterally-spaced-apart plates 74 and 76 situated on opposite sides of the baler immediately inboard of the side extremities of the tongue 54. Each of the plates 74, 76 is mounted for horizontal swinging movement on an upright pivot post 78, 80 respectively, secured to the corresponding side portion of the tongue 54 just forwardly of the forward extremity of the conveyor 60. The lower edges of the plates 74, 76 are spaced only a short distance above the upper stretch 62a of the conveyor 60, and the plates 74, 76 extend rearwardly to a point underlying the entrance 68 to the baling chamber 10, although such rearward point of termination varies as the plates 74, 76 swing laterally as will hereinafter be made apparent.

Figure 4:
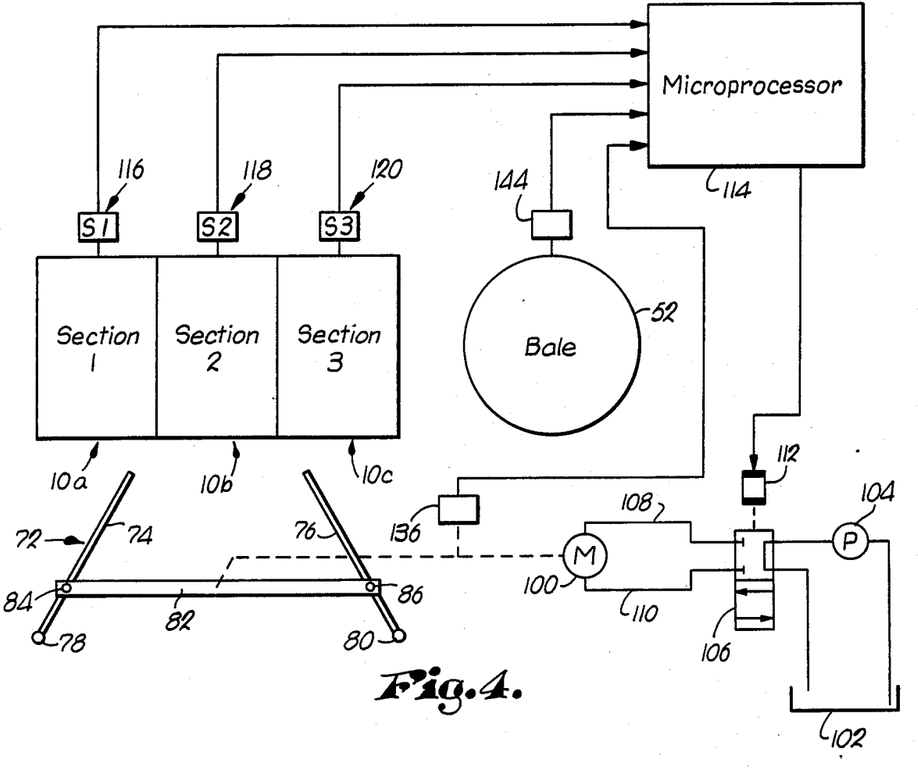
FIG. 4 is a schematic diagram illustrating the manner in which the deflector structure and control mechanism cooperates functionally with other portions of the baler.
Figure 7:
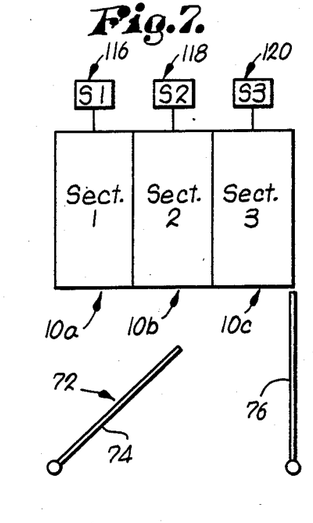

The two plates 74, 76 are interconnected across their upper edge extremities by a transverse tie bar 82 pivotally coupled at one end through an upright pivot 84 to the plate 74 and pivotally coupled at its opposite end through an upright pivot 86 to the plate 76. The tie bar 82 is of such length that the plate 74, 76 are maintained out of parallel relationship to one another and converge rearwardly in a symmetrical manner when in a centered position as illustrated in FIG. 4. On the other hand, because of the selected length of the tie bar 82, the plates 74, 76 are positioned with the plate 74 extending directly fore-and-aft and the plate 76 angled toward plate 74 when the deflector 72 is in its FIG. 5 position, while when the deflector is in its FIG. 7 position, the plate 76 extends directly fore-and-aft along the side of the baler and the opposite plate 74 is angled sharply toward the plate 76.

The tie bar 82 is driven back and forth longitudinally by an overhead pitman drive assembly broadly denoted by the numeral 88 having a power-receiving, input shaft 90 provided with a gear sprocket 92 at its upper end. An endless chain 94 entrains the sprocket 92 and is looped around a second, smaller sprocket 96 situated laterally outboard of the tongue 54 on the right side of the baler as the latter is viewed from the rear. The sprocket 96 is fixed to an upright shaft 96 which comprises the output shaft of a hydraulic motor 100 mounted on the outboard side of the right extremity of the baler tongue 54. The motor 100, as shown in FIG. 4, is connected in a hydraulic circuit with a source of hydraulic fluid 102 and a pump 104 (both on the tractor) for supplying fluid under pressure to the motor 100. A normally closed spool valve 106 in the line 108 from the pump 104 to the motor 100 determines whether or not such fluid will be provided to the motor 100 for operating the same, and a drain line 110 leads from the motor 10 back to the source 102.

Operation of the valve 106 to, in turn, control activation of the hydraulic motor 100 of the deflector 72 is controlled by a solenoid 112 (FIG. 4) which in turn is controlled by a microprocessor 114 capable of emitting an output to the solenoid 112 at the appropriate times. The microprocessor 114 receives inputs from several different sources, as illustrated in FIG. 4, and, based upon such inputs and the manner in which the microprocessor 114 has been programmed, is capable of making the appropriate decision to cause actuation of the motor 100 at the proper time.

In actual practice, a flow control valve (not shown) would probably be desirable as a part of the hydraulic circuit for the motor 100 in order to adjust the flow to varying tractor systems. If such is not necessary, however, a suitable four-way, two-position spool valve 106 as shown in FIG. 4 with an open center on the tractor side and closed center on the motor side has been found sufficient. The open center is desired so that a relief valve is not required in the system. Therefore, when the motor 100 is shut off, the tractor valve will remain actuated. The closed-center on the motor side is to insure that the motor 100 stops immediately when the valve is shut off. The motor 100, valve 106, and the various gear ratios of components within the drive assembly 88 are such that when the motor 100 is operating continuously, the deflector 72 makes a complete back-and-forth sweep across the baling chamber 10 once every seven to eight seconds.

Figure 2:
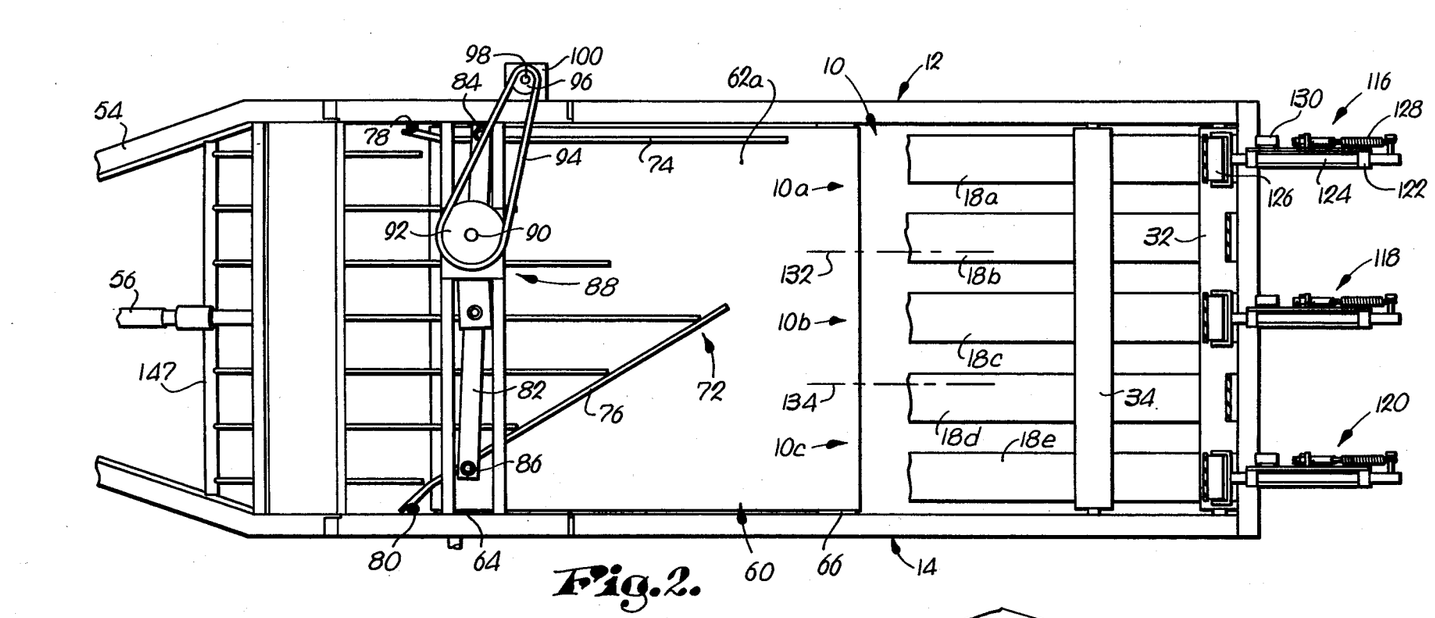
FIG. 2 is a fragmentary, top plan view of the baler with the forming belts thereof being only fragmentarily shown and the belt tensioning apparatus being entirely removed in order that details of construction of the in-feed conveyor and deflector structure can be clearly observed.

Throughout operation of the baler, the microprocessor 114 receives inputs from three sensors 116, 118 and 120 shown schematically in FIGS. 4–7 and in more detail in FIGS. 1 and 2. As illustrated in FIG. 2, all three of the sensor 116, 118, and 120 are mounted on the rear of the baler and include a mounting bracket 122 as well as a slide bar 124 supported by the bracket 122 for fore-and-aft shifting movement along a path of travel extending toward and away from the chamber 10. At its forward end, each of the slide bars 124 is provided with a roller 126 for contacting engagement with an appropriate one of the belts 18a, 18c, or 18e as the case may be. A tension spring 128 yieldably interconnects the bracket 122 with the rearmost end of the slide bar 124 to yieldably bias the latter toward the corresponding belt 18a, 18c, or 18e and thus maintain engagement of the roller 126 therewith. A rotory potentiometer 130 or other appropriate device is mechanically coupled with the slide bar 124 in such a manner as to convert linear motion of the latter, caused by changes in belt tension, into an electrical output which is received by the microprocessor 114. The three sensors 116, 118, and 120 thus serve, through tension in the three belts 18a, 18c, and 18e, to sense the condition of things within three transverse sections 10a, 10b, and 10c of the chamber 10, FIG. 2 illustrating imaginary lines of demarcation 132 and 134 which separate the center chamber section 10b from side sections 10a and 10b.

Figure 3:
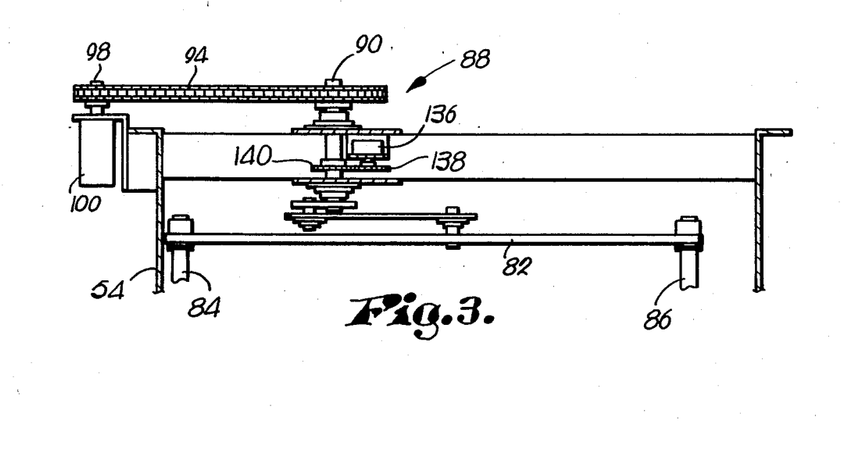
FIG. 3 is a fragmentary, partially enlarged, transverse cross-sectional view of the baler just forwardly of the deflector structure thereof and looking rearwardly in the baler.

The microprocessor 114 also receives an input during baler operation from a detector 136 which is mechanically coupled with the deflector 72 in such a manner as to provide a continuing indication to the microprocessor 114 of the position of the deflector 72. As illustrated in FIG. 3, the detector 136 may take the form of a rotary potentiometer mounted in close association with the deflector drive assembly 88 and having a gear sprocket 138 which meshes with a second sprocket 140 on the drive shaft 90 of assembly 88 to indicate the rotative position of the shaft 90, and hence the lateral position of the deflector 72 with respect to the three chamber sections 10a, 10b, and 10c.

The microprocessor 114 also receives an input from a sensing device 144 shown only schematically in the drawings (FIGS. 1 and 4) and coupled mechanically with the arm assembly 48 in such a way as to provide an indication of average bale size to the microprocessor 114. This is important as will be explained in more detail below because the deflector 72 is preferably caused to behave differently at different stages of bale growth, and thus some indication of the average size of the bale 52 needs to be provided to the microprocessor 114.

OPERATION

It will be well understood by those skilled in the art that, generally speaking, the baler moves down along a windrow of crop material in the field, picks up and loads such material into the baling chamber 10, and subjects the incoming materials to an initial tumbling action in the small generally triangular confines of the chamber as defined by the oppositely-moving, opposed web stretches 40 and 42. As materials continue to be added into the chamber 10, the web stretches 40, 42 deflect fore-and-aft respectively and the arm assembly 48 rises, as does the second arm assembly 50, so that the bale grows in chamber 10 and ultimately assumes the final, full size indicated in phantom lines in FIG. 1. Thereafter, the bale 52 may be wrapped with twine or other suitable materials, such as a protective wrap, and then discharged from the baler by having the entire rear half of the baler along parting line 146 in FIG. 1 open up to drop the bale 52 onto the ground. Suitable hydraulic power means (not shown) are provided for opening the baler in this manner.

The present invention contemplates that the operator may drive the tractor and baler along the windrow without the need for intentionally weaving or shifting either vehicle from a substantially straight-forward path of travel. It is only necessary in this respect for the operator to make certain the windrow gets onto the pickup 58; from there the baler takes over to properly distribute the materials in chamber 10.

Figure 5:
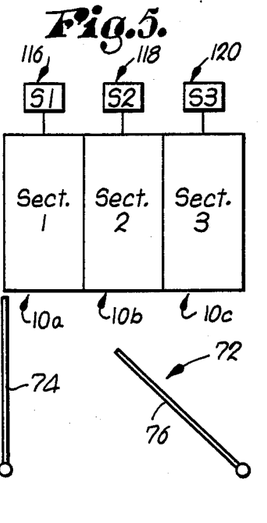
FIGS. 5, 6, and 7 are schematic representations of the deflector structure, chamber sections, and sensors associated therewith to illustrate the working relationship between the deflector and such portions of the baler.
Figure 6:
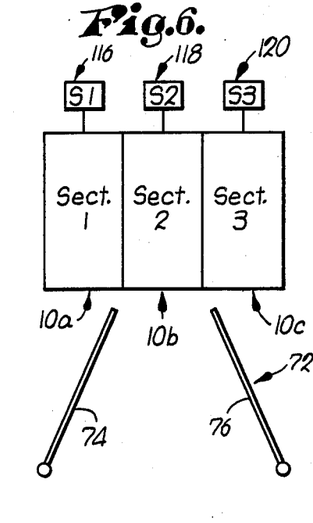

As crop materials are lifted off the ground by the pickup 58, they are deposited onto the front end of the conveyor 60 beneath a long, fore-and-aft extending wind guard 148 having tines of varying lengths so as to avoid interference with the deflector plates 74, 76 during their swinging movements. During the earliest part of the bale-forming cycle, the deflector 72 is caused to swing continuously back and forth on a nonstop basis so that materials moving along the conveyor 60 toward the chamber 10 are spread back and forth evenly between the three chamber sections 10a, 10b, and 10c. In this respect, the microprocessor 114 is programmed to receive the output of sensing device 144 indicating small bale size or emptiness in the chamber 10 and thus in effect override any inputs from sensors 116, 118, and 120 to provide an actuating output to the solenoid 112, thereby opening valve 106 and causing hydraulic motor 100 to drive the deflector 72 in its sweeping action. When the sensing device 144 indicates to the microprocessor 114 that the bale core has reached a certain predetermined size, such as about one-half of its final dimensions, the microprocessor 114 will terminate its output to the solenoid 112 and cause the deflector 72 to come to rest in line with one of the three chamber sections 10a, 10b, or 10c, for example the chamber section 10a as illustrated in FIG. 5. Consequently, continued inflow of crop materials along the conveyor 60 results in the same being diverted into the chamber section 10a, building up the corresponding end portion of the bale 52. Of course, the detector 136 provides a continuing output to the microprocessor 114 at this time, as well as at earlier times, to provide the microprocesor 114 with an input of data regarding the particular position of the deflector 72.

As the bale begins to grow within the chamber section 10a, the sensor 116 provides an input to the microprocessor 114 which differs in magnitude from that provided by the next adjacent chamber section 10b, since the belt 18a becomes tensioned more greatly than the belt 18c. When this differential reaches a certain predetermined amount, the microprocessor 114 causes the solenoid 112 to be activated, opening the valve 106 and causing the deflector 72 to shift rightwardly to its FIG. 6 position in line with chamber section 10b. When the deflector 72 reaches its position of FIG. 6 aligned with chamber section 10b, such arrival is inputted to the microprocessor by the detector 136, causing the output to solenoid 112 to be terminated, thereby closing the valve 106 and shutting off the motor 100. Crop material continues to be directed into the center section 10b by the deflector 72 until such time as the microprocessor 114, comparing the inputs from the sensors 118 and 120, determines that the appropriate and preselected differential in size between the bale portions in sections 10b and section 10c has occurred, whereupon the microprocessor 114 is again operable to activate the solenoid 112 and turn on the motor 100 to swing the deflector 72 to its FIG. 7 position in line with the chamber section 10c. Again, the position of the deflector 72 is noted by the detector 136 and relayed to the microprocessor 114 which thereupon terminates its output to the solenoid 112 and shuts off the motor 100.

Filling of the section 10c then continues until such time as the differential between it and section 10b becomes sufficiently great as to cause the microprocessor 114 to shift the deflector 72 back to the center section 10b, whereupon the middle portion of the bale is built up further. When the size difference between bale portions in chamber sections 10b and 10a becomes great enough, the microprocessor 114 causes the deflector 72 to be shifted to end section 10a.

This process of intermittent dwelling of the deflector 72 at each of the chamber sections 10a, 10b and 10c continues for numerous back and forth cycles of the deflector 72, preferably on the order of five to ten complete cycles. In the preferred embodiment, the microprocessor 114 is programmed such that the differential or "error" in bale portion size between adjacent chamber sections 10a, 10b and 10c gradually decreases as the bale 52 grows. In other words, whereas on the first sweep of the deflector 72 after core formation, the successive stops or dwells cause hay to be deposited to a certain depth on the bale, subsequent sweeps result in progressively thinner deposits. This is due to the relationship between the microprocessor 114 and the bale size sensing device 144 which continuously provides an input to the microprocessor 114 throughout the entirety of the bale-forming cycle. Thus, when the sensor 114 indicates to the microprocessor 114 that the bale has reached the net growth level in the series, the microprocessor 114 responds by appropriately diminishing the error required for the deflector 72 to shift from one chamber section to the next.

In the preferred embodiment, bale growth is divided into sixteen different levels corresponding to sixteen progressively increasing analog output magnitudes from the average bale size potentiometer 144. The table set forth below correlates bale size potentiometer outputs with the desired error for adjacent bale portions throughout the bale-forming process:

| TABLE OF BALE SIZE VERSUS DESIRED ERRORS | |
| --- | --- |
| Bale Size | Desired Error |
| 0-5 | not applicable |
| 6 | 32 |
| 7 | 29 |
| 8 | 26 |
| 9 | 23 |
| 10 | 20 |
| 11 | 17 |
| 12 | 16 |
| 13 | 16 |
| 14 | 16 |
| 15 | 16 |

The above table illustrates that through the first five levels of bale size, the error is irrelevant because the microprocessor 114 is programmed to move the deflector 72 in a continuous, nonstop manner. This occurs until the bale is approximately one-half its final size, as mentioned earlier. Then, as the bale reaches level 6, the microprocessor 114 is operable, from that point on, to react by appropriately shifting the deflector 72 only when the detected error corresponds to the programmed value. In this respect, as the bale grows from level 6 to level 7, the desired error has a value of 32, which does not change until the bale reaches size level 7, whereupon the desired error drops to 29, and so forth as clearly shown by the table. Finally, as the bale approaches maximum size at levels 12 through 15, the desired error drops to a magnitude of 16 and remains constantly at that point for the duration of the cycle.

Although a variety of control hardware is commercially available and would be satisfactory in carrying out the principles of the present invention, one controller found to be suitable is a Motorola Model 6802 microprocessor along with an ADC0809 A/D converter. Additional chips include a PIA and EPROM along with assorted glue chips. Such hardware can also be used in connection with controlling an automatic twine dispensing apparatus for binding the completed bale, as discussed below.

Figure 8:
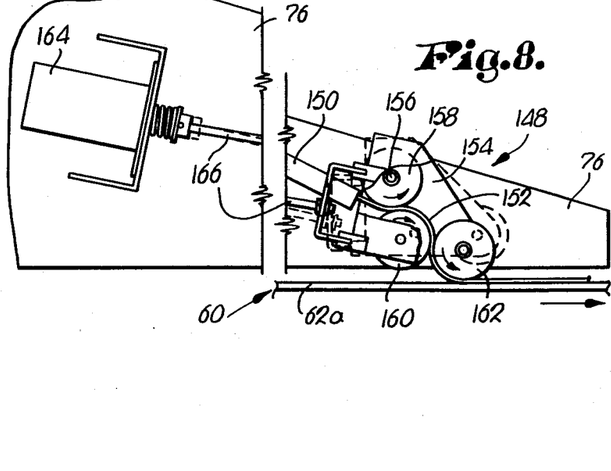
FIG. 8 is a fragmentary, side elevational view of novel twine dispensing apparatus forming a part of and usable with the present invention.

Twine-Dispensing Apparatus of FIG. 8

FIG. 8 illustrates a unique twine-dispensing apparatus broadly denoted by the numeral 148 which may be employed with the deflector 72. In this respect, there may actually be one apparatus 148 for each of the deflector plates 74, 76 since each plate 74, 76 sweeps along only approximately one-half of the chamber 10.

The apparatus 148 includes a twine tube 150 attached to and extending generally longitudinally of the plate 74 (for example) through which a length of twine 152 is dispensed. A support rocker 154 is pivotally mounted on the plate 74 by a transverse pivot 156 for vertical rocking movement relative to the plate 74 between the alternative solid and phantom line positions illustrated in FIG. 8. Three nip rollers 158, 160, and 162 are rotatably mounted on the rocker 153 in such close relationship to one another that although a twine strand 152 may be fed therethrough in the manner illustrated in FIG. 8, rotation of one of the rollers 156-162 necessarily causes conjoint rotation of the remaining rollers due to their contacting engagement with one another and nip pressure applied to the twine strand 152. As illustrated, the roller 162 is disposed slightly below the other two rollers 158 and 160.

A solenoid 164 likewise mounted on the deflector plate 74 has push-pull link 166 connected with the rocker 154 in a cranked relationship with the pivot axis 156 thereof such that longitudinal shifting in opposite directions of the link 166 by solenoid 164 causes the rocker 152 to rock about the pivot 156. When the rocker 154 is rocked downwardly to its full line position, the lowermost roller 162 is brought into contacting engagement with the upper stretch 62a of the conveyor 60, thereby imparting counterclockwise rotation to the roller 162 as viewed in FIG. 8. This in turn causes conjoint rotation of the other rollers 158 and 160, causing the twine stretch 152 to be drawn out of the tube 150 and deposited onto the conveyor 60 in the indicated manner for reception between the roller 36 on the one hand (covered by the belts 18) and the bottom of the bale 52 on the other hand, whereupon the twine becomes effectively wrapped around the bale by the rotation of the bale itself. Once the twine begins wrapping around the bale, the solenoid 164 is turned off and the rocker 154 is returned to its raised position.

Ideally, the tying process begins automatically and is controlled by the microprocessor 114, using the deflector position sensor 136 as a source of information regarding the position of the twine tube 150. After the deflector 72 reaches a starting position, just right or left of the bale center, the rocker 154 is lowered to engage roller 162 with the conveyor 60, and twine is discharged into the bale chamber 10. First, a double wrap is provided around the bale, and then the deflector 72 is moved laterally, stopping at a plurality of intermediate positions for single wraps of twine, until reaching the final or end position of the bale, where the latter is given a double wrap. The deflector 72 is then moved still further to the extreme end of the bale, whereupon the twine is severed by any suitable means (not shown). The same cycle is then repeated on the other one half of the bale, using the other deflector plate 74 or 76 as the case may be, until the bale is completely wrapped with twine, whereupon it may be ejected from the baler and the entire baling and tying process repeated.

It should thus be apparent that the foregoing describes a baler having distinct and unique features representing a significant advance in the art. While minor changes in the illustrated embodiment could be made by those skilled in the art, it will be apparent that such changes would still fall within the spirit and gist of the present invention, and the scope of this invention should therefore be limited only by a fair reading of the claims.

A program listing of a program usable in connection with the microprocessor 114 for causing the same to perform in accordance with the principles of the present invention is set forth below.

We claim:

1. In a mobile baler for making cylindrical bales from crop material lifted from a windrow on the ground and fed into a baling chamber of the baler as the latter advances, the improvement comprising:
   structure selectively shiftable laterally relative to the chamber for directing incoming crop material into a selected one of plurality of transverse sections of the chamber;
   means for sensing the relative sizes of bale portions forming in the respective chamber sections; and
   control mechanism operably coupled with said sensing means for intermittently shifting said structure between the plurality of chamber sections in response to a determination that the size of the bale portion in the chamber section receiving materials from said structure exceeds the size of the bale portion in a next adjacent chamber section by a certain, predetermined amount.

2. In a baler as claimed in claim 1, said bale chamber being defined in part by a plurality of flexible webs, there being at least one of said webs for each of said chamber sections, said sensing means being disposed to detect changes in the tension of at least one web for each chamber section.

3. In a baler as claimed in claim 2, said sensing means comprising potentiometers adapted to provide variable electrical outputs to said mechanism in accordance with the level of tension in the webs associated therewith.

4. In a baler as claimed in claim 1, said sensing means including a separate sensor for each of said chamber sections respectively, said mechanism including means for comparing the input from sensors associated with a pair of adjacent chamber sections and for shifting said structure when the difference between such inputs exceeds a certain predetermined value.

5. In a baler as claimed in claim 4, said structure being shiftable by said mechanism back and forth from one lateral extreme of the chamber to the other, dwelling at each successive chamber section for a period of time dependent in length upon the extent of difference in value between the inputs from sensors of each successive, adjacent pair of chamber sections along the path of travel of the structure.

6. In a baler as claimed in claim 5, said baler further including a conveyor for delivering materials lifted from the ground to said chamber, said structure comprising a deflector for diverting incoming crop material on the conveyor into the appropriate chamber section.

7. In a baler as claimed in claim 5, said means for comparing inputs comprising a microprocessor capable of producing an electrical output for shifting the structure, said mechanism further including a motor coupled with said structure for driving the latter in its shifting movement for the duration of said electrical output fom the microprocessor.

8. In a baler as claimed in claim 7, said motor being hydraulically powered and provided with a normally closed, actuable valve which alternatively permits or precludes the admittance of hydraulic fluid to the motor, said valve being operably coupled with an electrically powered actuator capable of opening the valve in response to receiving an electrical output from the microprocessor.

9. In a baler as claimed in claim 7, said mechanism further including detector means for sensing the position of said structure relative to the chamber sections and providing an input to the microprocessor, said microprocessor being capable of terminating its output and deactivating said motor upon receiving an input from said detector means.

10. In a baler as claimed in claim 9, said mechanism further including a sensing device operably coupled with the microprocessor for providing the latter with information regarding average bale size during the bale-forming process, said microprocessor being capable of causing said structure to shift continuously back and forth along the chamber sections at the commencement of the bale-forming process until the bale has reached a certain predetermined core diameter.

11. In a baler as claimed in claim 10, said microprocessor further being operable, upon the bale reaching said predetermined core diameter and as the bale continues to grow, to progressively reduce the differential in bale portion sizes required to cause said structure to shift from one chamber section to the next.

12. In a baler as claimed in claim 9, said bale chamber being defined in part by a plurality of flexible webs, there being at least one of said webs for each of said chamber sections, said sensing means being disposed to detect changes in the tension of at least one web for each chamber section.

13. In a baler as claimed in claim 1, said structure comprising a pair of generally upright downstream converging laterally spaced apart plates for directing incoming crop material into the selected section.

14. In a mobile baler for making cylindrical bales from crop material lifted from a windrow on the ground and fed into a baling chamber of the baler as the latter advances, the improvement comprising:
structure selectively shiftable laterally relative to the chamber for directing incoming crop material into a selected one of a plurality of transfer sections of the chamber;
means for sensing the relative sizes of the bale portions forming in the respective chamber sections; and
control mechanism operably coupled with said sensing means for intermittently shifting said structure between the plurality of chamber sections in response to a determination that the size of the bale portion in the chamber section receiving materials from said structure exceeds the size of the bale portion in a next adjacent chamber section by a certain, predetermined amount,
said sensing means including a separate sensor for each of said chamber sections respectively, said mechanism including means for comparing the input from sensors associated with a pair of adjacent chamber sections and for shifting said structure when the difference between such input exceeds a certain predetermined value,
said structure being shiftable by said mechanism back and forth from one lateral extreme of the chamber to the other, dwelling at each successive chamber section for a period of time dependent in length upon the extent of the difference in value between the inputs from sensors of each successive, adjacent pair of chamber sections along the path of travel of the structure,
said baler further including a conveyor for delivering materials lifted from the ground to said chamber, said structure comprising a deflector for diverting incoming crop material on the conveyor into the appropriate chamber section,
said deflector having a twine discharge apparatus associated therewith including a twine feeding roller operable when driven to dispense twine from the source thereof, said roller being selectively engagable with said conveyor for receiving driving power therefrom.

15. In a baler for making cylindrical crop bales from crop material, the improvement comprising:
a pickup for lifting crop materials off the ground as the baler advances;
a conveyor for receiving materials from the pickup and delivering the same rearwardly;
an expandable baling chamber at the rear discharge end of the conveyor defined in part by a plurality of separate, flexible, bale-compacting webs and capable of expanding in size as a bale is progressively formed therein,
said webs being disposed in side-by-side relationship in association with respective, corresponding sections of the chamber as the latter is traversed from one lateral extremity thereof to the other;
a deflector overlying said conveyor and shiftable laterally into a number of alternative positions for directing materials on the conveyor into any selected one of the chamber sections;
a sensor for each of said chamber sections respectively operably coupled with the corresponding web of the chamber section and responsive to the level of tension in the web to produce an input;
control means disposed to receive inputs from said sensors and compare the same with one another,
said control means being capable of producing an output upon determination that the difference between the input from the sensor for the chamber section at which the deflector is positioned and that from the sensor of the next adjacent chamber section exceeds a certain predetermined value;
a motor operably coupled with said deflector and capable upon receiving an output from said control means of shifting the deflector into successive positions at the next adjacent chamber sections; and
detector means for sensing the arrival of the deflector at each successive chamber section and for then deactivating the motor until the next said output from the control means.

16. In a baler as claimed in claim 15, said control means including a microprocessor.

17. In a baler as claimed in claim 16, said improvement further comprising a sensing device responsive to average bale size for providing a signal to the microprocessor, said microprocessor being operable to cause said structure to shift continuously back and forth along the chamber section at the commencement of the bale-forming process until the bale has reached a certain predetermined core diameter.

18. In a baler as claimed in claim 17, said microprocessor further being operable, upon the bale reaching said predetermined core diameter and as the bale continues to grow, to progressively reduce the differential in bale portion sizes required to cause said structure to shift from one chamber section to the next.

19. In a baler for making cylindrical crop bales from crop material, the improvement comprising:
- a pickup for lifting crop materials off the ground as the baler advances;
- a conveyor for receiving materials from the crop pickup and delivering the same rearwardly;
- an expandable baling chamber at the rear discharge end of the conveyor defined in part by a plurality of separate, flexible, bale-compacting webs and capable of expanding in size as a bale is progressively formed therein,
- said webs being disposed in side-by-side relationship in association with respective, corresponding sections of the chamber as the latter is traversed from one lateral extremity thereof to the other;
- a deflector overlying said conveyor and shiftable laterally into a number of alternative positions for directing materials on the conveyor into any selected one of the chamber sections;
- a sensor for each of said chamber sections respectively operably coupled with the corresponding web of the chamber section and responsive to the level of tension in the web to produce an input;
- control means disposed to receive inputs from said sensors and compare the same with one another,
- said control means being capable of producing an output upon determination that the difference between the input from the sensor for the chamber section at which the deflector is positioned and that from the sensor of the next adjacent chamber section exceeds a certain predetermined value;
- a motor operably coupled with said deflector and capable upon receiving an output from said control means of shifting the deflector into successive positions at the next adjacent chamber sections; and
- detector means for sensing the arrival of the deflector at each successive chamber section and for then deactivating the motor until the next said output from the control means,
- said structure having a twine discharge apparatus associated therewith including a twine feeding roller operable when driven to dispense twine from a source thereof, said roller being selectively engagable with said conveyor for receiving driving power therefrom.

20. In a method of making a cylindrical bale from crop material that is picked up from a windrow and fed into a baling chamber as the chamber is advanced along the windrow, the improvement comprising:
- directing picked up material into limited sections of the baling chamber corresponding to different axial portions of the bale in successive, discrete steps and at periodic intervals so that the bale is formed at least in part by building up one axial portion thereof at a time without shifting the baling chamber transversely of the windrow.

21. In a method as claimed in claim 20, said directing step including comparing the size of the buildup in one chamber section with that of a next adjacent chamber section and if the resulting differential exceeds a certain predetermined amount, terminating the directing of material into the one chamber section and commencing it in the next adjacent chamber section.

22. In a method as claimed in claim 21; and before said directing step, distributing picked up material continuously back-and forth in the chamber to form a cylindrical core of material upon which to thereafter build the different portions of the bale using said directing step.

23. In a method as claimed in claim 22, said comparing step including after formation of said core, the step of progressively reducing the magnitude of said predetermined amount as the bale increases in size.

24. In a method as claimed in claim 21, said comparing step including the step of progressively reducing the magnitude of said predetermined amount as the bale increases in size.

25. In a method as claimed in claim 20; and before said directing step, distributing picked up material continuously back-and forth in the chamber to form a cylindrical core of material upon which to thereafter build the different portions of the bale using said directing step.

26. In a baler for producing cylindrical bales from crop materials lying on the ground and having a component which moves continuously during the bale forming process, the improvement comprising:
- a twine discharge guide disposed for directing twine to a bale to be tied;
- actuatable apparatus adjacent the discharge end of said guide for engaging and feeding the twine from the guide,
- said apparatus including a rotatable driven member selectively shiftable into and out of a position engaging said moving component of the baler for receiving driving power therefrom for actuating said apparatus; and
- an actuator operably coupled with said driven member for effecting said shifting thereof.

27. In a baler as claimed in claim 26, said apparatus further including a pair of mutually interengaging nip rollers gripping the twine therebetween, said driven roller being disposed in driving engagement with one of said nip rollers.

28. In a baler as claimed in claim 27, said nip rollers and said driven rollers being mounted on a common support rockable toward and away from said moving component by said actuator for effecting said shifting of the driven roller.

29. In a baler as claimed in claim 28, said moving component comprising a conveyor belt disposed for feeding materials picked up from the ground into a baling chamber of the baler, said common support for the nip rollers and the driven roller comprising a deflector movable back-and-forth across said conveyor for distributing picked up materials in the baling chamber.

30. In a baler as claimed in claim 26, said actuator comprising an electrically powered solenoid.

31. In a mobile baler for making cylindrical bales from crop material lifted from a windrow on the ground and fed in a stream into a baling chamber of the baler as the latter advances, the improvement comprising:
- means for sensing an uneven distribution of crop materials in the baling chamber; and
- means responsive to said sensing means for adjusting position of the stream of materials entering the chamber without repositioning the baler relative to the windrow.

32. In a mobile baler as claimed in claim 31, wherein said position-adjusting means is operable to adjust the position of the stream of materials relative to the chamber after the materials have first been lifted off the ground.

33. In a mobile baler as claimed in claim 32, wherein said position-adjusting means includes a deflector movable laterally with respect to the direction of movement of the baler and a programmable controller operably coupled with the deflector for moving the latter in response to signals received from said sensing means.

34. In a method of making a cylindrical bale from crop material that is picked up from a windrow and fed in a stream into a baling chamber as the chamber is advanced along the windrow, the improvement comprising:

adjusting the position of the stream of materials entering the bale chamber in response to sensing the uneven distribution of such materials in the chamber without laterally adjusting the position of the bale chamber relative to the ground.

35. In a method of making a cylindrical bale as claimed in claim 34, wherein the position of the stream of materials is adjusted after the materials have been lifted from the ground.

36. In a method of making a cylindrical bale as claimed in claim 35, wherein the position of the stream of materials is adjusted by deflecting the same laterally with respect to the path of travel of the chamber, said adjusting step including controlling the extent and direction of stream deflection according to the uneven distribution sensed in the chamber.

* * * * *